United States Patent
Derr et al.

(10) Patent No.: US 6,906,124 B2
(45) Date of Patent: Jun. 14, 2005

(54) NON-INFLAMMABLE, TRANSLUCENT POLYCARBONATE MOLDING MATERIALS

(75) Inventors: Torsten Derr, Dormagen (DE); Thomas Eckel, Dormagen (DE); Michael Zobel, Köln (DE); Dieter Wittmann, Leverkusen (DE); Andreas Seidel, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 130 days.

(21) Appl. No.: 10/296,339

(22) PCT Filed: May 21, 2001

(86) PCT No.: PCT/EP01/05782
§ 371 (c)(1), (2), (4) Date: Nov. 25, 2002

(87) PCT Pub. No.: WO01/92399
PCT Pub. Date: Dec. 6, 2001

(65) Prior Publication Data
US 2003/0158304 A1 Aug. 21, 2003

(30) Foreign Application Priority Data
Jun. 2, 2000 (DE) .......................... 100 27 341

(51) Int. Cl.$^7$ ............................................. C08K 5/523
(52) U.S. Cl. ...................... 524/127; 524/140; 524/141; 524/145
(58) Field of Search .................. 524/127, 140–141, 524/145

(56) References Cited

U.S. PATENT DOCUMENTS

| | | | |
|---|---|---|---|
| 4,220,583 A | | 9/1980 | Mark ..................... 260/45.7 S |
| 4,996,255 A | | 2/1991 | Davis et al. ................. 524/261 |
| 5,061,745 A | * | 10/1991 | Wittmann et al. .......... 524/139 |
| 5,204,394 A | * | 4/1993 | Gosens et al. .............. 524/125 |
| 5,266,618 A | * | 11/1993 | Watanabe et al. ........... 524/405 |
| 6,022,917 A | * | 2/2000 | Kobayashi .................. 524/127 |
| 6,331,584 B1 | * | 12/2001 | Nodera et al. .............. 524/115 |
| 6,369,141 B1 | * | 4/2002 | Ishii et al. .................... 524/127 |
| 6,664,362 B2 | * | 12/2003 | Kobayashi .................. 528/196 |

FOREIGN PATENT DOCUMENTS

| | | | |
|---|---|---|---|
| DE | 34 30 234 | * | 2/1986 |
| DE | 0 173 856 | | 3/1986 |
| DE | 197 34 667 | | 2/1999 |
| EP | 0 682 081 | | 11/1995 |

OTHER PUBLICATIONS

Patent Abstract of Japan vol. 2000, No. 07, Sep. 29, 2000 & JP 2000 109670 A (Mitsubishi Engineering Plastics Corp), Apr. 18, 2000 Zusammenfassung.

* cited by examiner

*Primary Examiner*—Peter Szekely
(74) *Attorney, Agent, or Firm*—Joseph C. Gil; Aron Preis

(57) ABSTRACT

A translucent thermoplastic molding composition containing polycarbonate, phosphorous compound and a fluorinated polyolefin is disclosed. Characterized in its excellent flame proofing, optical properties and resistance to chemicals the composition is suitable for making articles that in the course of use come in contact with solvents lubricants and cleaning compositions.

16 Claims, No Drawings

NON-INFLAMMABLE, TRANSLUCENT POLYCARBONATE MOLDING MATERIALS

The present invention relates to flame-resistant translucent polycarbonate moulding compositions which comprise oligophosphates and specific fluorinated polyolefins and have an excellent flameproofing and optical properties (translucency) as well as a good resistance to chemicals.

U.S. Pat. No. 4,220,583 describes translucent flameproofed polycarbonate moulding compositions which comprise small amounts of partly fluorinated polyolefins and small amounts of organic alkali metal salts or alkaline earth metal salts and have a good toughness.

EP-A 415 072 describes transparent flameproofed polycarbonate moulding compositions which have been rendered flame-resistant with silylarylsiloxy units.

However, the moulding compositions according to U.S. Pat. No. 4,220,583 and EP-A 415 072 do not always display a satisfactory combination of properties in respect of flow properties, processing properties and resistance to chemicals.

EP-A 173 856 discloses polycarbonate moulding compositions which comprise specific thermoplastic polycarbonates based on tetraalkylated diphenols, aromatic phosphate esters and tetrafluoroethylene polymers. It is reported that translucent mixtures can be achieved by addition of polytetrafluoroethylene. The moulding compositions have disadvantages in respect of flow properties and resistance to chemicals.

The object of the present invention is to provide flameproofed PC moulding compositions which are distinguished by a high level of flameproofing, in particular good afterburning times, good processing properties and good mechanical properties as well as translucent properties. These moulding compositions are therefore particularly suitable for those uses in which contact with specific media, such as e.g. solvents, lubricants, cleaning compositions etc., may occur.

It has now been found that modified polycarbonate moulding compositions which comprise oligophosphates and specific formulations of fluorinated polyolefins have the desired profile of properties.

The invention therefore provides polycarbonate compositions comprising

A) 70 to 99.5, preferably 80 to 99, in particular 85 to 98.5 parts by wt. of polycarbonate and B) 0.5 to 18, preferably 0.7 to 15, in particular 0.9 to 11 parts by wt. of phosphorus compounds of the formula (I)

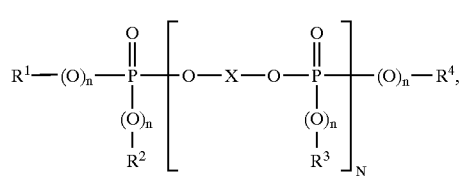

wherein $R^1$, $R^2$, $R^3$ and $R^4$ independently of one another denote $C_1$–$C_8$-alkyl which is optionally substituted by halogen, or $C_5$–$C_6$-cycloalkyl, $C_6$–$C_{10}$-aryl or $C_7$–$C_{12}$-aralkyl, in each case optionally substituted by halogen and/or alkyl, n independently of one another, denotes 0 or 1, N denotes a number between 0.1 and 10 and X denotes a mono- or polynuclear aromatic radical having 6 to 30 C atoms, or a linear or branched aliphatic radical having 2 to 30 C atoms, which can be OH-substituted and can contain up to 8 ether bonds, and C) 0.01 to 0.7, preferably 0.05 to 0.5, in particular 0.05 to 0.4 parts by wt. of a fluorinated polyolefin, characterized in that the polymer compositions are translucent.

The sum of the parts by weight of all the components is 100.

Translucency in the context according to the invention is understood as meaning the property of indeed allowing light through a material but of deflecting it by small solid, opaque particles in the material such that objects behind the material can no longer be clearly recognized. Slight to high translucency therefore results, depending on the concentration of the opaque particles in the material. Translucent materials always transmit light. Transparent materials would allow light through without deflection and without scattering (similar to glass).

According to the invention, translucency is classified into 5 stages (from (0) transparent to (4) opaque) with in each case decreasing transparency and increasing translucency.

(0) not translucent (completely transparent, shining through like glass or pure polycarbonate (completely see-through))

(1) minimally translucent (almost transparent, almost shining through like glass, a few solid particles detectable)

(2) slightly translucent (slightly milky, but still transparent)

(3) translucent (milky, but still transparent)

(4) not translucent, not transparent (opaque)

Compositions of classes (1) to (3) are the subject matter of the invention. That is to say objects, e.g. a document lying behind a 3.2 mm thick specimen of the material, can be read without problems. Furthermore, when the material is employed in DP housings (e.g. mobile telephones, computers, monitors, printers) with a wall thickness of 3.2 mm, the internal activity of an apparatus can still be clearly seen.

The compositions according to the invention are distinguished by an optimum combination of properties between translucency and transparency, and in rating are classified into classes (1) to (3). Particularly preferred compositions are those which have the rating (1) and (2).

Component A

Aromatic polycarbonates and/or aromatic polyester-carbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610 and DE-OS 3 832 396; for the preparation of aromatic polyester-carbonates see e.g. DE-OS 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents which are trifunctional or more than trifunctional, for example triphenols or tetraphenols.

Diphenols for the preparation of the aromatic polycarbonates and/or aromatic polyester-carbonates are preferably those of the formula (II)

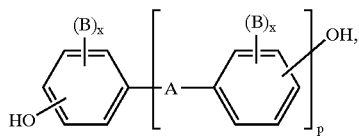
(II)

wherein
A denotes a single bond, $C_1$–$C_5$-alkylene, $C_2$–$C_5$-alkylidene, $C_2$–$C_5$-alkylidene, $C_5$–$C_6$-cycloalkylidene, —O—, —SO—, —CO—, —S—, —SO$_2$—, $C_6$–$C_{12}$-arylene, to which further aromatic rings optionally containing heteroatoms can be fused,
or a radical of the formula (III) or (IV)

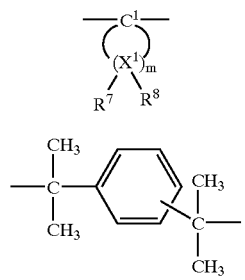

B in each case denotes $C_1$–$C_{12}$-alkyl, preferably methyl, or halogen, preferably chlorine and/or bromine,
x in each case independently of one another, denotes 0, 1 or 2 and
p is 1 or 0, and
$R^7$ and $R^8$ can be chosen individually for each $X^1$ and independently of one another denote hydrogen or $C_1$–$C_6$-alkyl, preferably hydrogen, methyl or ethyl,
$X^1$ denotes carbon and
m denotes an integer from 4 to 7, preferably 4 or 5, with the proviso that on at least one atom $X^1$, $R^7$ and $R^8$ are simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and derivatives thereof brominated on the nucleus and/or chlorinated on the nucleus.

Particularly preferred diphenols are 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or -chlorinated derivatives thereof, such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-Bis-(4-hydroxyphenyl)-propane (bisphenol A) is particularly preferred.

The diphenols can be employed individually or as any desired mixtures.

The diphenols are known from the literature or are obtainable by processes known from the literature.

Suitable chain terminators for the preparation of the thermoplastic aromatic polycarbonates are, for example, phenol, p-chlorophenol, p-tert-butylphenol or 2,4,6-tribromophenol, and also long-chain alkylphenols, such as 4-(1,3-tetramethylbutyl)-phenol according to DE-A 2 842 005 or monoalkylphenols or dialkylphenols having a total of 8 to 20 C atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the molar sum of the particular diphenols employed.

The thermoplastic aromatic polycarbonates have average weight-average molecular weights ($M_w$, measured e.g. by ultracentrifuge or scattered light measurement) of 10,000 to 200,000, preferably 20,000 to 80,000.

The thermoplastic aromatic polycarbonates can be branched in a known manner, and in particular preferably by incorporation of 0.05 to 2.0 mol %, based on the sum of diphenols employed, of compounds which are trifunctional or more than trifunctional, for example those with three or more phenolic groups.

Both homopolycarbonates and copolycarbonates are suitable. To prepare copolycarbonates according to the invention according to component A, 1 to 25 wt. %, preferably 2.5 to 25 wt. % (based on the total amount of diphenols to be employed), of polydiorganosiloxanes with hydroxy-aryloxy end groups can also be employed. These are known (see, for example, U.S. Pat. No. 3,419,634) or can be prepared by processes known from the literature. The preparation of copolycarbonates comprising polydiorganosiloxanes is described e.g. in DE-A 3 334 782.

Preferred polycarbonates are, in addition to the bisphenol A homopolycarbonates, the copolycarbonates of bisphenol A with up to 15 mol %, based on the molar sum of diphenols, of other diphenols mentioned as preferred or particularly preferred, in particular 2,2-bis(3,5-dibromo-4-hydroxyphenyl)-propane.

Aromatic dicarboxylic acid dihalides for the preparation of aromatic polyester-carbonates are preferably the di-acid dichlorides of isophthalic acid, terephthalic acid, diphenyl ether-4,4'-dicarboxylic acid and naphthalene-2,6-dicarboxylic acid.

Mixtures of the di-acid dichlorides of isophthalic acid and terephthalic acid in a ratio of between 1:20 and 20:1 are particularly preferred.

A carbonic acid halide, preferably phosgene, is additionally co-used as a bifunctional acid derivative in the preparation of polyester-carbonates.

Possible chain terminators for the preparation of the aromatic polyester-carbonates are, in addition to the monophenols already mentioned, also chlorocarbonic acid esters thereof and the acid chlorides of aromatic monocarboxylic acids, which can optionally be substituted by $C_1$–$C_{22}$-alkyl groups or by halogen atoms, as well as aliphatic $C_2$–$C_{22}$-monocarboxylic acid chlorides.

The amount of chain terminators is in each case 0.1 to 10 mol %, based on the moles of diphenols in the case of the phenolic chain terminators and on the moles of dicarboxylic acid dichlorides in the case of monocarboxylic acid chloride chain terminators.

The aromatic polyester-carbonates can also comprise incorporated aromatic hydroxycarboxylic acids.

The aromatic polyester-carbonates can be either linear or branched in a known manner (for this see also DE-A 2 940 024 and DE-A 3 007 934).

Branching agents which can be used are, for example, carboxylic acid chlorides which are 3-functional or more than 3-functional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (based on the dicarboxylic acid dichlorides employed), or phenols which are 3-functional or more than 3-functional, such as phloroglucinol, 4,6-dimethyl-2,4,6-tri-(4-hydroxyphenyl)-hept-2-ene, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane or 1,4-bis[4,4'-dihydroxytri-phenyl)-methyl]-benzene, in amounts of 0.01 to 1.0 mol %, based on the diphenols employed. Phenolic branching agents can be initially introduced into the reaction vessel with the diphenols, and acid chloride branching agents can be introduced together with the acid dichlorides.

The content of carbonate structural units in the thermoplastic aromatic polyester-carbonates can vary as desired. The content of carbonate groups is preferably up to 100 mol %, in particular up to 80 mol %, particularly preferably up to 50 mol %, based on the sum of ester groups and carbonate groups. Both the ester and the carbonate content of the aromatic polyester-carbonates can be present in the polycondensate in the form of blocks or in random distribution.

The relative solution viscosity ($\eta_{rel}$) of the aromatic polycarbonates and polyester-carbonates is in the range from 1.18 to 1.4, preferably 1.22 to 1.3 (measured on solutions of 0.5 g polycarbonate or polyester-carbonate in 100 ml methylene chloride at 25° C.).

The thermoplastic aromatic polycarbonates and polyester-carbonates can be employed by themselves or in any desired mixture with one another.

Component B

The moulding compositions according to the invention comprise as flameproofing agents phosphorus compounds according to formula (I)

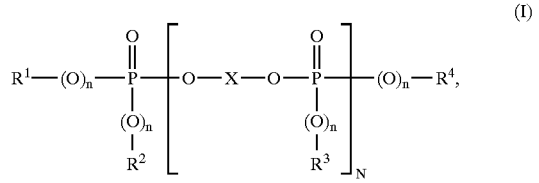

(I)

in which the radicals have the abovementioned meanings.

Preferably, $R^1$, $R^2$, $R^3$ and $R^4$ independently of one another represent $C_1$–$C_4$-alkyl, phenyl, naphthyl or phenyl-$C_1$–$C_4$-alkyl. The aromatic groups $R^1$, $R^2$, $R^3$ and $R^4$ can in their turn be substituted by alkyl groups, preferably $C_1$–$C_4$-alkyl. Particularly preferred aryl radicals are cresyl, phenyl, xylenyl, propylphenyl or butylphenyl.

X in the formula (I) preferably denotes a mono- or polynuclear aromatic radical having 6 to 30 C atoms. This is preferably derived from diphenols of the formula (II).

n in the formula (I) is preferably 1.

N can assume values from 0.1 to 10, preferred values are from 0.7 to 5, particularly preferably 0.7 to 3, in particular 0.9 to 1.5. Mixtures of different phosphates according to formula (I) can also be employed as component B according to the invention. In this case N can assume the abovementioned values as average values. The mixtures can also comprise monophosphorus compounds (N=0).

Monophosphorus compounds of the formula (I) are, in particular, tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, methylphosphonic acid dimethyl ester, methylphosphonic acid diphenyl ester, phenylphosphonic acid diethyl ester, triphenylphosphine oxide or tricresylphosphine oxide. Triphenyl phosphate is a particularly preferred monophosphorus compound.

The average N values can be determined by determining the composition of the phosphate mixture (molecular weight distribution) by means of suitable methods (gas chromatography (GC), high pressure liquid chromatography (HPLC), gel permeation chromatography (GPC)) and calculating the mean values for N therefrom.

X particularly preferably represents

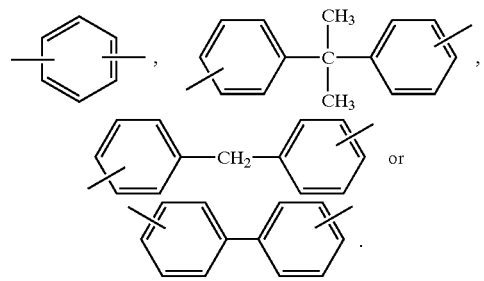

The phosphorus compounds according to component B, formula (I) are known (cf. e.g. EP-A 363 608 or EP-A 640 655) or can be prepared by known methods in an analogous manner (e.g. Ullmanns Encyklopädie der technischen Chemie, vol. 18, p. 301 et seq. 1979; Houben-Weyl, Methoden der organischen Chemie, vol. 12/1, p. 43; and Beilstein vol. 6, p. 177).

Component C

The fluorinated polyolefins C are of high molecular weight and have glass transition temperatures above −30° C., as a rule above 100° C., fluorine contents preferably of 65 to 76, in particular 70 to 76 wt. %, and average particle diameters $d_{50}$ of 0.05 to 1,000, preferably 0.08 to 20 µm. In general, the fluorinated polyolefins C have a density of 1.2 to 2.3 g/cm³. Preferred fluorinated polyolefins C are polytetrafluoroethylene, polyvinylidene fluoride and tetrafluoroethylene/-hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, page 484–494; "Fluorpolymers" by Wall, Wiley-Interscience, John Wiley & Sons, Inc., New York, volume 13, 1970, page 623–654; "Modern Plastics Encyclopaedia", 1970–1971, volume 47, no. 10 A, October 1970, McGraw-Hill, Inc., New York, page 134 and 774; "Modern Plastics Encyclopaedia", 1975-1976, October 1975, volume 52, no. 10 A, McGraw-Hill, Inc., New York, page 27, 28 and 472 and U.S. Pat. Nos. 3,671,487, 3,723,373 and 3,838,092).

They can be prepared by known processes, thus, for example, by polymerization of tetrafluoroethylene in an aqueous medium with a catalyst which forms free radicals, for example sodium peroxydisulfate, potassium peroxydisulfate or ammonium peroxydisulfate, under pressures of 7 to 71 kg/cm² and at temperatures of 0 to 200° C., preferably at temperatures of 20 to 100° C. (For further details see e.g. U.S. Pat. No. 2,393,967). The density of these materials can be between 1.2 and 2.3 g/cm³ and the average particle size between 0.5 and 1,000 µm, depending on the use form.

Fluorinated polyolefins C which are preferred according to the invention are employed in the form of emulsions with average particle diameters of 0.05 to 20 µm, preferably 0.08 to 10 µm, and a density of 1.2 to 1.9 g/cm³, or in the form of powders with average particle diameters of 100 to 1,000 µm and densities of 2.0 g/cm³ to 2.3 g/cm³.

According to the invention, the fluorinated polyolefins C are employed in the form of specific formulations:

C.1) as a coagulated mixture with at least one vinyl (co)polymer, the fluorinated polyolefin C or polyolefin mixture being mixed as an emulsion with at least one emulsion of the components and the mixture then being coagulated.

or

C.2) as a masterbatch with at least one vinyl (co)polymer, the fluorinated polyolefin C being mixed as a powder with a powder or granules of the vinyl (co)polymer and the mixture being compounded in the melt, in general at temperatures of 208° C. to 330° C., in the conventional units, such as internal kneaders, extruders or twin-shaft screws.

Components C according to the invention can also be obtained by polymerizing suitable vinyl monomers in the presence of fluorinated polyolefin emulsions.

Suitable vinyl (co)polymers are polymers of at least one monomer from the group consisting of vinylaromatics, vinyl cyanides (unsaturated nitriles), (meth)acrylic acid ($C_1$–$C_8$)-alkyl esters, unsaturated carboxylic acids and derivatives (such as anhydrides and imides) of unsaturated carboxylic acids. Particularly suitable (co)polymers are those of C.1.1 50 to 99, preferably 60 to 80 parts by wt. of vinylaromatics and/or vinylaromatics substituted on the nucleus (such as, for example, styrene, α-methylstyrene, p-methylstyrene and p-chlorostyrene) and/or methacrylic acid ($C_1$–$C_8$)-alkyl esters (such as e.g. methyl methacrylate and ethyl methacrylate) and C.1.2 1 to 50, preferably 20 to 40 parts by wt. of vinyl cyanides (unsaturated nitriles), such as acrylonitrile and methacrylonitrile, and/or (meth)acrylic acid ($C_1$–$C_8$)-alkyl esters (such as e.g. methyl methacrylate, n-butyl acrylate and t-butyl acrylate) and/or unsaturated carboxylic acids (such as maleic acid) and/or derivatives (such as anhydrides and imides) of unsaturated carboxylic acids (for example maleic anhydride and N-phenyl-maleimide).

The (co)polymers are resinous, thermoplastic and rubber-free.

The copolymer of C.1.1 styrene and C.1.2 acrylonitrile is particularly preferred.

The (co)polymers are known and can be prepared by free-radical polymerization, in particular by emulsion, suspension, solution or bulk polymerization. The (co) polymers preferably have molecular weights $\overline{M}_w$ (weight-average, determined by light scattering or sedimentation) of between 15,000 and 200,000.

The emulsion mixture is then coagulated in a known manner, for example by spray drying, freeze drying or coagulation by means of addition of inorganic or organic salts, acids, bases or organic water-miscible solvents, such as alcohols or ketones, preferably at temperatures of 20 to 150° C., in particular 50 to 100° C. If necessary, the product can be dried at 50 to 200° C., preferably 70 to 100° C.

Pure PTFE powder (PTFE=polytetrafluoroethylene) or PTFE formulations with a high PTFE content are preferred.

Suitable tetrafluoroethylene polymer emulsions are commercially available products and are available, for example, from DuPont (Wilmington, Del., USA) as Teflon® 30 N or from Dyneon GmbH (Burgkichen, Germany) as Hostaflon®.

The weight ratio of vinyl (co)polymer to fluorinated polyolefin in the masterbatch is 95:5 to 5:95, preferably 70:30 to 30:70. The PTFE content is particularly preferably >40% and <70%.

Suitable fluorinated polyolefin powders are commercially available products and are available, for example, from DuPont as Teflon® CFP 6000 N or from Dyneon GmbH (Burgkichen, Germany) as Hostaflon® TF 2071.

The compositions according to the invention can comprise further additives and polymers or mixtures thereof, the choice of additives and polymers being made such that these do not substantially impair the translucency of the moulding composition and the desired profile of properties. Those polymers or copolymers which are miscible with polycarbonate are particularly advantageous. Some possible additives are mentioned in the following.

The compositions according to the invention can comprise very finely divided inorganic compounds. These inorganic compounds include compounds of one or more metals of main groups 1 to 5 or sub-groups 1 to 8 of the periodic table, preferably of main groups 2 to 5 or sub-groups 4 to 8, particularly preferably of main groups 3 to 5 or sub-groups 4 to 8, with the elements oxygen, sulfur, boron, phosphorus, carbon, nitrogen, hydrogen and/or silicon.

Preferred compounds are, for example, oxides, hydroxides, hydrated oxides, sulfates, sulfites, sulfides, carbonates, carbides, nitrates, nitrites, nitrides, borates, silicates, phosphates, hydrides, phosphites or phosphonates.

Preferred very finely divided inorganic compounds are, for example, TiN, $TiO_2$, $SnO_2$, WC, ZnO, $Al_2O_3$, AlO(OH), $ZrO_2$, $Sb_2O_3$, iron oxides, $NaSO_4$, $BaSO_4$, vanadium oxides, zinc borate and silicates, such as Al silicates, Mg silicates and one-, two- and three-dimensional silicates. Mixtures and doped compounds can also be used. These nanoscale particles can furthermore be modified on the surface with organic molecules in order to achieve a better compatibility with the polymers. Hydrophobic or hydrophilic surfaces can be produced in this manner.

The average particle diameters are less than or equal to 200 nm, preferably less than or equal to 150 nm, in particular 1 to 100 nm.

Particle size and particle diameter always means the average particle diameter $d_{50}$, determined by ultracentrifuge measurements by the method of W. Scholtan et al. Kolloid-Z. und Z. Polymere 250 (1972), p. 782 to 796.

The inorganic compounds can be in the form of powders, pastes, sots, dispersions or suspensions. Powders can be obtained by precipitation from dispersions, sols or suspensions.

The powders can be incorporated into the thermoplastics by conventional processes, for example by direct kneading or extrusion of the constituents of the moulding composition and the very finely divided inorganic powders. Preferred processes are the preparation of a masterbatch, e.g. in flameproofing additives, other additives, monomers or solvents, or in component A or the co-precipitation of dispersions of components B or C with dispersions, suspensions, pastes or sols of the very finely divided inorganic materials.

The moulding compositions according to the invention can furthermore comprise at least one of the conventional additives, such as lubricants and mould release agents, for example pentaerythritol tetrastearate, nucleating agents, antistatics, stabilizers, fillers and reinforcing substances and dyestuffs and pigments, if the desired profile of properties is not adversely influenced. The compositions according to the invention can furthermore comprise hydroxy-ethers, preferably in small amounts.

The moulding compositions according to the invention can comprise up to 35 wt. %, based on the total moulding composition, of a further flameproofing agent optionally having a synergistic action, if the desired profile of properties is not adversely influenced. Further flameproofing agents which are mentioned by way of example are organic halogen compounds, such as decabromobisphenyl ether and tetrabromobisphenol, inorganic halogen compounds, such as ammonium bromide, nitrogen compounds, such as melamine and melamine-formaldehyde resins, inorganic hydroxide compounds, such as Mg hydroxide and Al hydroxide, inorganic compounds, such as antimony oxides, barium metaborate, hydroxoantimonate, zirconium oxide, zirconium hydroxide, molybdenum oxide, ammonium molybdate, zinc borate, ammonium borate, talc, silicate, silicon oxide and tin oxide, and siloxane compounds. Mono-phosphate compounds, oligomeric phosphate compounds or mixtures thereof can furthermore also be employed as flameproofing agents. Such phosphorus compounds are described in EP-A 363 608, EP-A 345 522 and DE-OS 197 21 628.

The moulding compositions according to the invention comprising components A to C and optionally further known additives, such as stabilizers, dyestuffs, pigments, lubricants and mould release agents, nucleating agents and antistatics and fillers and reinforcing substances, are prepared by mixing the particular constituents in a known manner and subjecting the mixture to melt compounding and melt extrusion at temperatures of 200° C. to 300° C. in conventional units, such as internal kneaders, extruders and twin-shaft screws, preferably in extruders.

The mixing of the individual constituents can be carried out in a known manner both successively and simultaneously, and in particular both at about 20° C. (room temperature) and at a higher temperature.

The invention therefore also provides a process for the preparation of the moulding compositions.

The moulding compositions of the present invention can be used for the production of all types of shaped articles. In particular, shaped articles can be produced by injection moulding. Examples of shaped articles which can be produced are: housing components of all types, e.g. for domestic appliances, such as juice presses, coffee machines and mixers, or for office machines, such as monitors, printers or copiers, or cover sheets for the building sector and components for the motor vehicle sector. They can furthermore be employed in the field of electrical engineering, because they have very good electrical properties.

The moulding compositions according to the invention can furthermore be used, for example, for the production of the following shaped articles or mouldings:

Interior fittings for railway vehicles, housings for electrical equipment containing small transformers, housings for equipment for data transmission and transfer, housings and linings for medical purposes, massage equipment and housings therefor, toy vehicles for children, flat wall elements, housings for safety devices, thermally insulated transportation containers, devices for housing or care of small animals, mouldings for sanitary and bath fittings, cover gratings for ventilator openings, mouldings for garden and equipment sheds and housings for garden equipment.

Another form of processing is the production of shaped articles by thermoforming from previously produced sheets or films.

The present invention therefore also provides the use of the moulding compositions according to the invention for the production of all types of shaped articles, preferably those mentioned above, and the shaped articles made from the moulding compositions according to the invention.

EXAMPLES

Component A

Polycarbonate based on bisphenol A with a relative solution viscosity of 1.278, measured in methylene chloride at 25° C. and in a concentration of 0.5 g/100 ml.

Component B

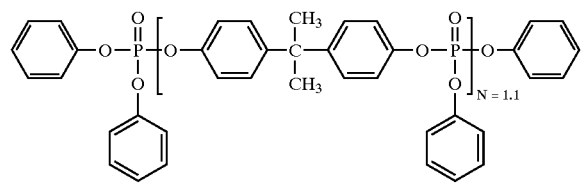

For determination of the number-average N value stated, the contents of the oligomeric phosphates were first determined by HPLC measurements:

| | |
|---|---|
| Column type: | LiChrosorp RP-8 |
| Eluent in gradient: | acetonitrile/water 50:50 to 100:0 |
| Concentration: | 5 mg/ml |

The number-weighted N mean value was then calculated from the contents of the individual components (mono- and oligophosphates) by known methods.

Component C

| | |
|---|---|
| C.1 Blendex ® 449: | PTFE preparation from General Electric Plastics of 50 wt. % PTFE and 50 wt. % styrene/acrylonitrile copolymer. |
| C.2: | PTFE powder Teflon CFP 6000 N (DuPont, Wilmington, Delaware, USA) |

Preparation and Testing of the Moulding Compositions According to the Invention

The components are mixed with the conventional processing auxiliaries on a ZSK 25 twin-screw extruder. The shaped articles are produced on an injection moulding machine of the type Arburg 270E at 260° C.

The notched impact strength is determined in accordance with the method of ISO 180 1A on bars of dimensions 80×10×4 mm³ at room temperature.

The Vicat B heat distortion point is determined in accordance with DIN 53 460 on bars of dimensions 80×10×4 mm³.

The flame resistance is determined in accordance with UL 94V, and the total after-burning time is also determined in accordance with UL 94 V.

The stress cracking properties (ESC properties) are investigated on bars of dimensions 80×10×4 mm, pressing temperature 220° C. A mixture of 60 vol. % toluene and 40 vol. % isopropanol is used as the test medium. The test specimens are pre-extended by means of an arc template (pre-extension $\epsilon_x$ in per cent) and kept in the test medium at room temperature. The stress cracking properties are evaluated by the cracking or fracture as a function of the pre-extension in the test medium.

The MVR measurement (melt volume rate) (240/5) [cm³/10 min] is carried out in accordance with ISO 1133. The viscosity is measured in accordance with DIN 54 811.

TABLE 1

Composition and properties of the moulding compositions

|  | Comp. 1 | Comp. 2 | Comp. 3 | Example 1 | Example 2 |
|---|---|---|---|---|---|
| A | 100 | 95 | 93 | 92.5 | 96.1 |
| B | — | 6 | 6 | 5.5 | 3.25 |
| C-1 | — | — | — | 0.5 | 0.25 |
| C-2 | — | — | 1 | — | — |
| Vicat B 120 [° C.] | 144.4 | 124.9 | 124.3 | 125.9 | 133 |
| $a_k$ ISO 180 1 A [kJ/m²] RT | 10.9 | 6.4 | 6.5 | 6.9 | 6.3 |
| ESC properties Fracture at ex [%] | 0.6 | 0.4 | 0.4 | 0.4 | 0.6 |
| Rating 1.6 mm UL 94 V | V2 | f* | V0 | V0 | V0 |
| Total after-burning time [sec] | 54 |  | 6 | 17 | 14 |
| MVR | 7.9 | 17.85 | 14.6 | 14.9 | — |
| Viscosity 260° C. 1,000 Pa · s⁻¹ | 584 | 365 | 370.0 | 403 | — |
| Translucency | 0 transparent | 0 transparent | 4 opaque | 1 according to the invention | 3 according to the invention |

*f = failed

The moulding compositions according to the invention (example 1 and 2) show the desired combination of properties of excellent flameproofing, good mechanical properties, and good flow properties coupled with excellent optical properties (translucency). Comparison example 1 and 2 (without PTFE) indeed show an outstanding transparency, but do not offer adequate flameproofing. Comparison example 3 (with pure PTFE powder) indeed has an excellent flame resistance, but is not transparent/translucent.

What is claimed is:

1. Composition comprising
   A) 70 to 99.5 parts by wt. of polycarbonate and
   B) 0.5 to 18 parts by wt. of phosphorus compound of the formula (I)

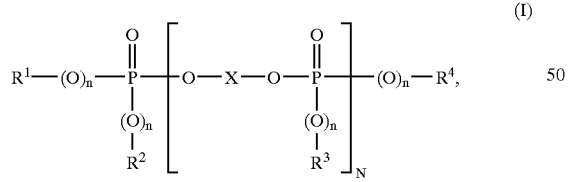

(I)

wherein
   $R^1$, $R^2$, $R^3$ and $R^4$ independently of one another each denote $C_1$- to $C_8$-alkyl, or $C_5$- to $C_6$-cycloalkyl, $C_6$- to $C_{20}$-aryl or $C_7$- to $C_{12}$-aralkyl, in each case optionally substituted by alkyl, preferably $C_1$–$C_4$-alkyl,
   n independently of one another, denotes 0 or 1,
   N denotes a number between 0.1 and 10 and
   X denotes a mono- or polynuclear aromatic radical having 6 to 30 C atoms, or a linear or branched aliphatic radical having 2 to 30 C atoms, which can be OH-substituted and can contain up to 8 ether bonds, C) 0.01 to 0.7 parts by wt. of fluorinated polyolefin in the form of a coagulated mixture with at least one resinous thermoplastic and rubber free vinyl (co)polymer, characterized in that the composition is translucent.

2. Composition according to claim 1, comprising 80 to 99 parts by wt. of polycarbonate.

3. Composition according to claim 1 comprising 0.7 to 15 parts by wt. of phosphorus compound of the formula (I).

4. Composition according to claim 1 comprising 0.05 to 0.5 parts by wt. of fluorinated polyolefin.

5. Composition according to claim 1 comprising phosphorus compounds of the formula (I) wherein $R^1$, $R^2$, $R^3$ and $R^4$ independently of one another represent $C_1$–$C_4$-alkyl, phenyl, naphthyl or phenyl-$C_1$–$C_4$-alkyl and the aromatic groups can be unsubstituted or substituted.

6. Composition according to claim 1 comprising phosphorus compounds of the formula (I) wherein X is derived from diphenols of the formula (II):

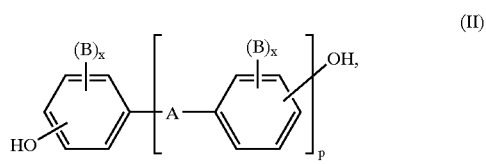

(II)

wherein

A denotes a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, to which further aromatic rings optionally containing heteroatoms can be fused, or a radical of the formula (III) or (IV)

(III)

-continued

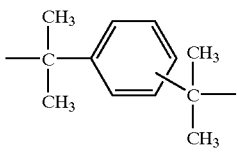

(IV)

B in each case denotes $C_1$–$C_{12}$-alkyl or halogen, x in each case independently of one another, denotes 0, 1 or 2 and p is 1 or 0, and $R^7$ and $R^8$ can be chosen individually for each $X^1$ and independently of one another denote hydrogen or $C_1$–$C_6$-alkyl, $X^1$ denotes carbon and m denotes an integer from 4 to 7, with the proviso that on at least one atom $X^1$, $R^7$ and $R^8$ are simultaneously alkyl.

7. Composition according to claim 1 comprising phosphorus compounds of the formula (I) wherein N denotes 0.7 to 5.

8. Composition according to claim 1 comprising phosphorus compounds of the formula (I) wherein N denotes 0.7 to 3.

9. Composition according to claim 1 comprising a mixture of phosphates according to formula (I).

10. Composition according to claim 1 wherein X in formula (I) represents

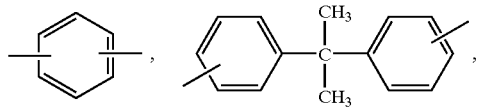

-continued

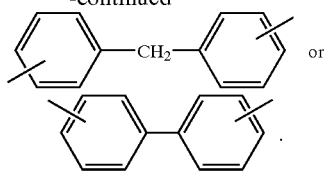

11. Composition according to claim 1 wherein said B) further contains at least one member selected from the group consisting of tributyl phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, methylphosphonic acid dimethyl ester, methylphosphonic acid diphenyl ester, phenylphosphonic acid diethyl ester, triphenylphosphine oxide and tricresylphosphine oxide.

12. Composition according to claim 1 comprising 0.05 to 0.5 parts by wt. of fluorinated polyolefin.

13. Composition according to claim 1 further containing at least one member selected from the group consisting of inorganic compounds having average particle diameter less than or equal to 200 nm, fillers, reinforcing substances, lubricants, mold release agents, nucleating agents, antistatics, stabilizers, dyestuffs and pigments.

14. Composition according to claim 13, comprising at least one additive chosen from the group consisting of lubricants and mould release agents, nucleating agents, antistatics, stabilizers, dyestuffs and pigments.

15. Process for the preparation of the compositions according to claim 1 wherein the individual components are mixed and compounded.

16. Shaped articles and mouldings obtainable from compositions according to claim 1.

* * * * *